No. 710,198. Patented Sept. 30, 1902.
E. KEMPSHALL.
MANUFACTURE OF PLAYING BALLS.
(Application filed June 25, 1902.)
(No Model.)
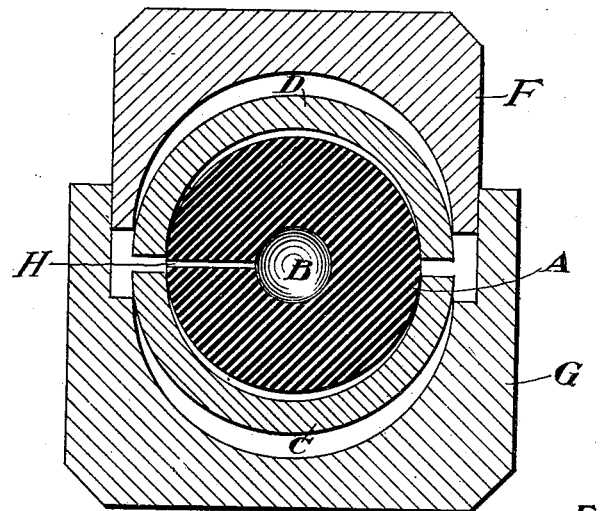
Fig. 1.
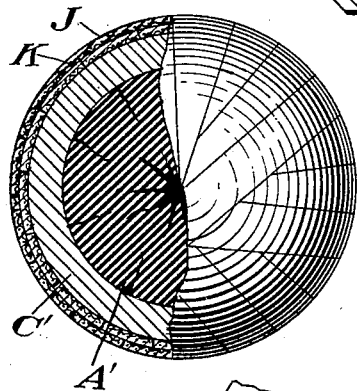
Fig. 2.
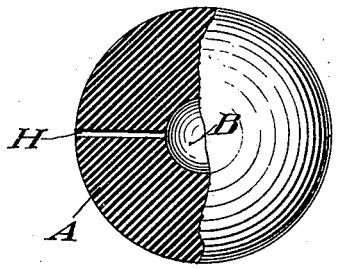
Fig. 3.
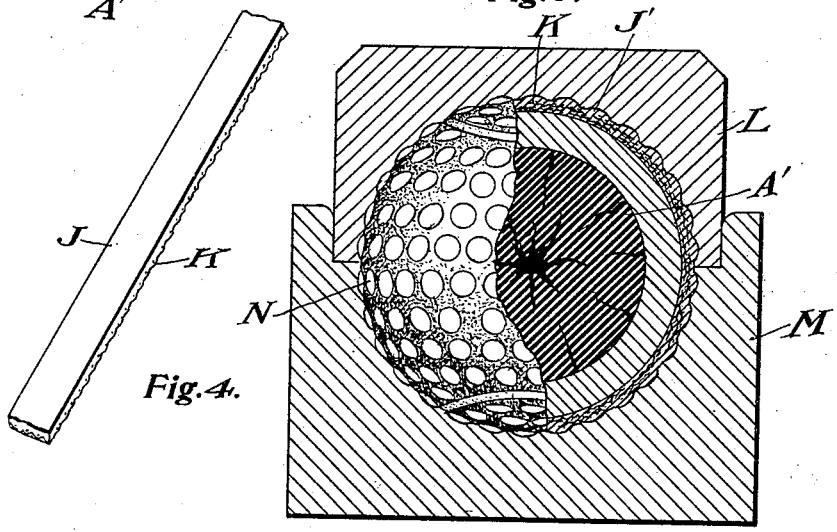
Fig. 4.
Fig. 5.
Witnesses:
H. Jacobi
B. C. Stickney.
Inventor:
Eleazer Kempshall
By his Attorney
F. H. Richards.
THE NORRIS PETERS CO., PHOTO-LITHO., WASHINGTON, D. C.

UNITED STATES PATENT OFFICE.

ELEAZER KEMPSHALL, OF BOSTON, MASSACHUSETTS.

MANUFACTURE OF PLAYING-BALLS.

SPECIFICATION forming part of Letters Patent No. 710,198, dated September 30, 1902.

Application filed June 25, 1902. Serial No. 113,056. (No model.)

*To all whom it may concern:*

Be it known that I, ELEAZER KEMPSHALL, a citizen of the United States, residing in Boston, in the county of Suffolk and State of Massachusetts, have invented certain new and useful Improvements in the Manufacture of Playing-Balls, of which the following is a specification.

This invention relates to the manufacture of playing-balls, and especially to those used in the game of golf; and its object is to produce at low cost balls well adapted to the requirements of the game.

In the drawings forming part of this specification, Figure 1 illustrates the parts assembled prior to compressing the core of the ball and welding shell-segments thereon. Fig. 2, which is partly in section, shows the condition of the ball just prior to the final heating and compression thereof. Fig. 3 illustrates a hollow sphere used for the core of the ball. Fig. 4 shows a portion of a strip used in making the casing of the ball. Fig. 5 illustrates the last stage in forming the ball, this figure being partly in section.

Similar parts in the drawings are indicated by similar characters of reference.

For the core I use a thick-walled and substantial sphere A, of solid soft rubber, said sphere being hollow, as at B. Over this sphere I place hemispherical cups C and D, of plastic material—such as celluloid or gutta-percha, preferably the latter—and I place the whole between heating and compressing dies F and G, which are then brought together with great force. The rubber spherical shell A in its original condition is considerably oversize; but by the action of the dies the cups are forced together over said sphere and caused to weld at their edges, thus forming the ball consisting of a gutta-percha shell and a rubber core, the latter reduced in bulk. One of the main purposes of my invention is to force the rubber spherical shell A into a small compass or cause it to collapse, as at A', Fig. 2, thus compressing and distorting the rubber, which is put in an abnormal condition throughout, and hence imparts to the ball phenomenal flying power, both on account of its increased resilience and also because of its great expansive tendency or its tendency to recover its normal size or form, which serves instantly to restore the spherical shape of the cover C' when the latter is distorted by a blow. It will be observed that the core is reduced in diameter by the die action. I provide in the original rubber shell A an airvent H, so as to permit the sphere to be compressed to form a substantially solid sphere or one without a central hollow space, as at Figs. 2 and 5. Over the gutta-percha cover C', Fig. 2, I wind tightly strips consisting of celluloid J, faced or lined with fabric K, the celluloid preferably being in a partially-cured condition and the strips being preferably caused to adhere where they cross by cementing or otherwise. The ball thus completed I place between heating and compressing dies L and M, Fig. 5, whereby the ball is given its final form. The heat renders the celluloid plastic, and the compression thoroughly compacts the material of the casing as well as the gutta-percha cover C'. The dies are preferably provided with pits, whereby brambles or pebbles N are formed upon the ball.

By first welding the gutta-percha cover on the compressed core A', then overwinding said shell with strips or ligaments of fibrous material compounded with plastic material, then subjecting the whole to heat and compression, and maintaining the compression while the ball cools and the cover and casing harden I form a ball which is not only very lively and flies a long distance when struck a hard blow, but which is also practically rupture-proof. Owing to the pressure of the fabric in the casing the ball is prevented from being unduly sensitive when given a light blow by an implement, so that it is well adapted for "putting."

If desired, the casing J' may be omitted, and other variations may be resorted to within the scope of my present improvements.

Having described my invention, I claim—

1. A process in producing a playing-ball, consisting in inclosing a collapsible sphere of soft, resilient material between segments of plastic material, and welding said segments together by means of heat and compression; the compression being carried to an extent to reduce said rubber sphere in bulk.

2. A process in producing a playing-ball, consisting in inclosing a collapsible sphere of soft rubber between segments of plastic material, and applying heat and compression to said segments so as to cause them to soften and weld and also to reduce said rubber sphere in bulk; the compression being maintained while the shell cools and hardens.

3. A process in producing a playing-ball, consisting in surrounding a collapsible sphere of soft rubber by heated plastic material and subjecting the whole to compression to an extent to reduce the bulk of said rubber sphere.

4. A process in producing a playing-ball, consisting in inclosing a collapsible sphere of soft rubber in plastic material which is rendered soft by heat, subjecting the whole to compression to an extent to reduce said sphere in bulk, and maintaining the compression while said plastic material hardens.

5. A process in producing a playing-ball, consisting in forming a rubber sphere with a cavity, inclosing said sphere in plastic material which is rendered soft by heat, subjecting the whole to compression to an extent to substantially close said cavity, and maintaining the compression while said plastic material hardens.

6. A process in producing a playing-ball, consisting in inclosing a collapsible sphere of soft rubber between heated segments of gutta-percha, and applying compression to said segments so as to reduce said sphere in bulk and also cause the segments to weld.

7. A process in producing a playing-ball, consisting in inclosing a sphere of soft rubber having a central cavity between segments of gutta-percha, applying heat and compression to said segments so as to cause them to soften and weld and also to substantially close said cavity, and maintaining the compression while the shell cools and hardens.

8. A process of producing a playing-ball, consisting in inclosing a collapsible sphere of soft rubber in heated gutta-percha and subjecting the whole to compression to an extent to cause said sphere to collapse, and maintaining the compression while said plastic material hardens.

ELEAZER KEMPSHALL.

Witnesses:
B. C. STICKNEY,
JOHN O. SEIFERT.